JAMES R. GILBERT.
Improvement in Seed Sowers.
No. 123,257. Patented Jan. 30, 1872.
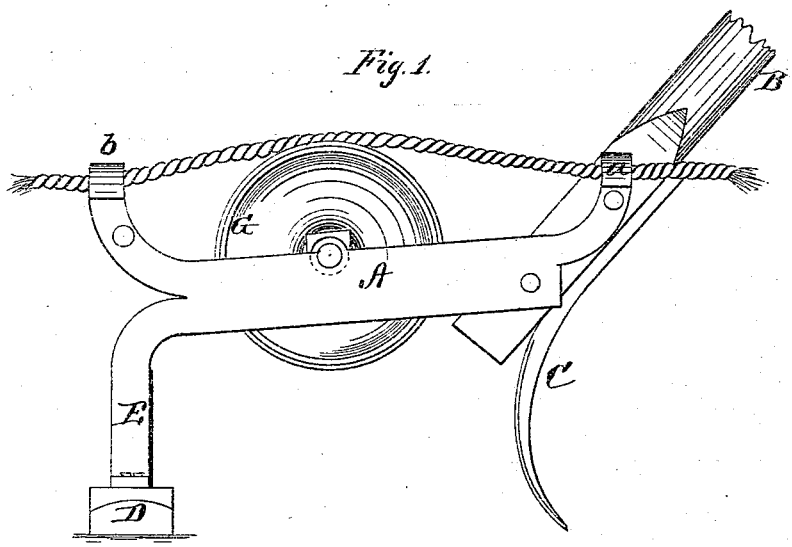
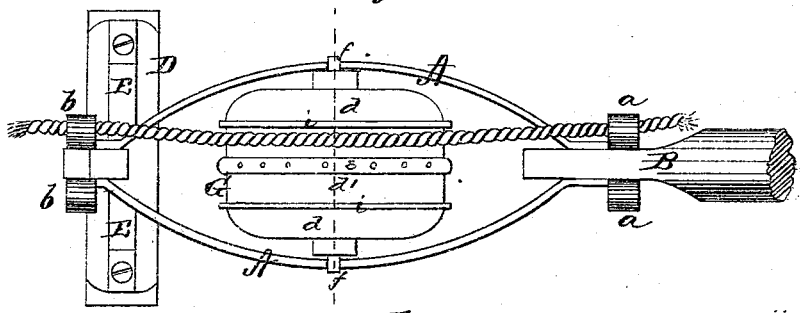
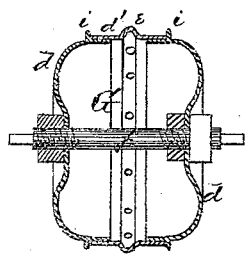
Witnesses:
Henry N. Miller
C. L. Evert
Inventor
James R. Gilbert
per Alexander Mason
Attorneys.

UNITED STATES PATENT OFFICE.

JAMES R. GILBERT, OF STARKVILLE, GEORGIA.

IMPROVEMENT IN SEED-SOWERS.

Specification forming part of Letters Patent No. 123,257, dated January 30, 1872.

*To all whom it may concern:*

Be it known that I, JAMES R. GILBERT, of Starkville, in the county of Lee and in the State of Georgia, have invented certain new and useful Improvements in Hand Seed-Sower; and do hereby declare that the following is a full, clear, and exact description thereof, reference being had to the accompanying drawing and to the letters of reference marked thereon making a part of this specification.

The nature of my invention consists in the construction and arrangement of a "garden seed-sower," as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a plan view of my machine. Fig. 3 is a longitudinal vertical section of the seed-box.

The frame of my seed-sower is composed of two bars or straps, A A, of iron, bent, as shown in Fig. 2, so as to form an oval space between them for the reception of the seed-box. The front ends of the bars A A are bent upward and forward, and have the handle B attached between them, said handle being of suitable length that the operator may walk upright. The extreme front (upper) ends of the bars A A are bent over so as to form hooks $a\ a$, one on each side of the handle B, and to the handle is secured the plow C. The rear ends of the side bars A A are split, one portion being bent downward and outward, forming the legs E, which are connected by a bar, D, and the other portion bent upward, and the extreme ends bent outward over, so as to form the hooks $b\ b$. Between these upward bent portions of the bars A A is placed a block, through which one or more bolts or rivets are passed to secure the bars together at this end. G represents the seed-box, made in circular form, of two heads, $d\ d$, and a central band, $d'$, connected by means of a central shaft, $f$, with suitable nuts. The heads $d\ d$ have flanges to fit inside of the band $d'$ and circumferential beads $i\ i$ coming close up to and projecting beyond the edges of the band. The band itself is provided with a central circumferential V-shaped bead, $e$, in which is a series of holes, through which the seed is discharged. The ends of the shaft $f$ are laid in notches or bearings formed in the upper edges of the bars A A.

This garden seed-sower is to be run on the ordinary marking-line used by gardeners in laying off the rows. The garden-line is stretched across the beds in the usual way, a stake being driven down at each end. The axis of the seed-receiver G is then placed in the notches of the frame, and the hooks $a\ b$ on either side of the sower are placed on the line, allowing the line to bear on the top of the seed-receiver between the bead $e$ and one of the beads $i$. Then, by pulling it forward by the handle, allowing the plow C in front to make a furrow, the line will revolve the seed box or receiver, the seed will fall in the furrow, and be covered by the sliding block D behind.

The perforated band $d'$ can be taken off at any time and exchanged for another having different size and different number of holes, to suit different seed. Any number of bands, with any size and number of holes, may be used with the machine, as required for different seed.

Having thus fully described my invention, what I claim as new, and desire to secure by Letters Patent, is—

1. The frame, consisting of the two bent bars A A, provided with hooks $a\ a$ and $b\ b$ and legs E E, all substantially as and for the purposes herein set forth.

2. The frame A, as described, provided with the plow C and bar D, with the seed-cylinder arranged upon said frame so as to be operated by the garden-line, substantially as and for the purpose set forth.

In testimony that I claim the foregoing I have hereunto set my hand this 19th day of September, 1871.

JAMES R. GILBERT.

Witnesses:
SAML. A. ADAMS,
DANIEL McKAY.